United States Patent
Wong

(10) Patent No.: US 7,725,338 B1
(45) Date of Patent: May 25, 2010

(54) TIME BASED PROFILE MANAGEMENT ON PALMTOP COMPUTER

(75) Inventor: Yoon Kean Wong, Menlo Park, CA (US)

(73) Assignee: PalmSource Inc., Sunnyvale, CA (US)

( * ) Notice: Subject to any disclaimer, the term of this patent is extended or adjusted under 35 U.S.C. 154(b) by 168 days.

(21) Appl. No.: 09/663,363

(22) Filed: Sep. 15, 2000

(51) Int. Cl.
*G06F 17/50* (2006.01)

(52) U.S. Cl. .................. 705/7; 705/9; 707/2; 707/7; 707/104.1; 455/418

(58) Field of Classification Search ............... 707/507, 707/2, 7, 104.1; 705/7–9; 455/418
See application file for complete search history.

(56) References Cited

U.S. PATENT DOCUMENTS

| | | | | |
|---|---|---|---|---|
| 4,551,620 | A * | 11/1985 | Rashev | 235/1 C |
| 5,457,476 | A * | 10/1995 | Jenson | 345/823 |
| 5,568,451 | A * | 10/1996 | Fukutomi | 368/10 |
| 5,570,109 | A * | 10/1996 | Jenson | 345/823 |
| 5,602,963 | A * | 2/1997 | Bissonnette et al. | 704/275 |
| 5,864,789 | A * | 1/1999 | Lieberman et al. | 704/9 |
| 5,873,108 | A * | 2/1999 | Goyal et al. | 715/507 |
| 5,899,979 | A * | 5/1999 | Miller et al. | 705/9 |
| 5,917,493 | A * | 6/1999 | Tan et al. | 345/835 |
| 5,963,913 | A * | 10/1999 | Henneuse et al. | 705/9 |
| 5,983,200 | A * | 11/1999 | Slotznick | 705/26 |
| 6,026,333 | A * | 2/2000 | Koyabu et al. | 700/16 |
| 6,101,480 | A * | 8/2000 | Conmy et al. | 705/9 |
| 6,243,699 | B1 * | 6/2001 | Fish | 707/2 |
| 6,345,268 | B1 * | 2/2002 | de la Huerga | 707/3 |
| 6,466,928 | B1 * | 10/2002 | Blasko et al. | 706/46 |
| 2002/0165905 | A1 * | 11/2002 | Wilson | 709/203 |
| 2004/0008971 | A1 * | 1/2004 | Young et al. | 386/69 |

OTHER PUBLICATIONS

Electronic meeting systems: Specifications, potential, and acquisition strategies by Pollard Carol E.; Journal of Systems Management; Cleveland: May/Jun. 1996; vol. 47, Iss.3; p. 22, 7 pgs; pp. 1-9.*
Business Monday Key to working at home: staying organized; [01 Edition] by Robin Lawson. Boston Herald. Boston, Mass.: Oct. 10, 1994. p. 26.*
Motorola's New Flexsmart-tm Pager With Organizer Features Combines Paging and Personal Information Manager Functions by Business editors. Business Wire. New York: Jul. 21, 1998. p. 1.*
Net Calendar Inc. to Launch Your Local Buzz- The First Wireless Local Event Service (Business Editors/Hi-Tech Writers. Business Wire. New York: Mar. 15, 2000. p. 1).*

* cited by examiner

*Primary Examiner*—Vanel Frenel
(74) *Attorney, Agent, or Firm*—Berry & Associates P.C.

(57) ABSTRACT

A personal information manager or other software program, preferably residing within a palmtop computer, uses a time of day profile to establish a default data category. When the user wishes to enter or edit data or retrieve data, the personal information manager or other software program inspects a real-time clock to determine the time of day. The personal information manager or other software program then establishes a default category based upon the time of day profile established by the user. The user is given the opportunity to modify the default category at any time. In this manner, for example, the user can establish a default business category during business times in days and a personal category during personal times in days. This provides the advantage of correctly categorizing data in an automated manner under most circumstances.

21 Claims, 9 Drawing Sheets

TIME BASED PROFILE MANAGEMENT ON PALMTOP COMPUTER

FIELD OF THE INVENTION

The present invention relates to the field of management of user profiles based on time information using a palmtop computer.

BACKGROUND

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer, a to-do list and an electronic notepad, to name a few.

Palmtop computer users generally use their palmtop computers for both business and personal use. As such, various functions carried out by the palmtop computer (e.g. PIM functions) serve both business and personal purposes. For example, a calendar management program used as a daily organizer may serve to provide records of appointments for both personal and business use. Similarly, an address book can carry both business contacts and personal contacts, and a to-do list can have personal tasks as well as business tasks. The palmtop computer user can currently segregate some of these tasks by designating a category at the time of entry, and at the time of retrieval, selectively retrieve only certain categories. But, the additional steps involved in categorizing entries and data being retrieved is often too cumbersome to encourage the user to fully utilize the palmtop computer's categorization features. Thus, entries are often left uncategorized and retrieval of data generally is done globally to retrieve all entries without bothering to look only for a particular category. As a result, the calendar viewed is typically filled with both personal and business appointments, all entries are generally viewed in the address book and a mixed business/personal to-do list is generally viewed. Identifying the data of interest can thus be encumbered with irrelevant data.

SUMMARY OF THE INVENTION

Accordingly, what is needed is a mechanism for automating the categorization of data and simplifying retrieval of data by a desired category.

A personal information manager or other software program, preferably residing within a palmtop computer, uses a time of day profile to establish a default data category. When the user wishes to enter or edit data or retrieve data, the personal information manager or other software program inspects a real-time clock to determine the time of day. The personal information manager or other software program then establishes a default category based upon the time of day profile established by the user. The user is given the opportunity to modify the default category at any time. In this manner, for example, the user can establish a default business category during business times in days and a personal category during personal times in days. This provides the advantage of correctly categorizing data in an automated manner under most circumstances.

In a computer implemented method (e.g. as in a personal information manager, email or browser program) consistent with embodiments of the present invention, a method of automating categorization of data, includes: determining a time of day; referencing a time of day profile that correlates time of day information with data categories; and setting a default data category based upon the time of day and the time of day profile.

A palmtop computer, consistent with certain embodiments of the present invention includes a programmed processor. A personal information manager program operates on the programmed processor. A clock provides information on a time of day. A program references a time of day profile that correlates time of day information with data categories. A default data category is set for the personal information manager based upon the time of day and the time of day profile.

In another embodiment, an electronic storage medium contains instructions which, when carried out on a programmed processor, carry out the steps of: determining a time of day; referencing a time of day profile that correlates time of day information with data categories; and setting a default data category based upon the time of day and the time of day profile.

The above summaries are intended to illustrate exemplary embodiments of the invention, which will be best understood in conjunction with the detailed description to follow, and are not intended to limit the scope of the appended claims.

DETAILED DESCRIPTION OF THE INVENTION

Figure 1:
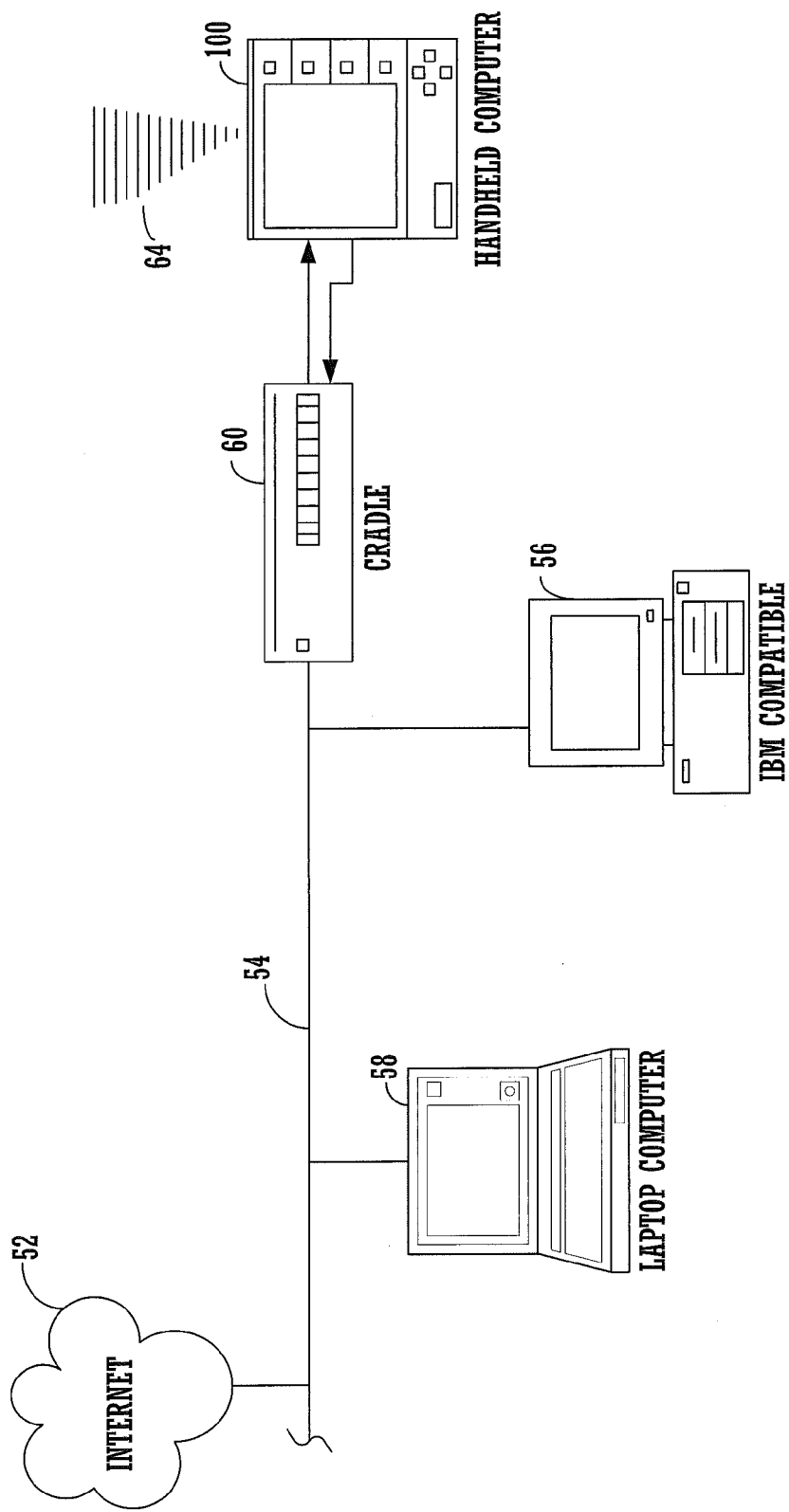
FIG. 1 is system illustration of a palmtop computer system connected to other computer systems and the Internet via a cradle device.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

For purposes of this document, the term "time of day", "time" and similar terms are intended to broadly embrace time. That is to say that the term "time" may include clock time, day, date, week, month, year, or any combination thereof. These terms should not generally be strictly interpreted to mean 12 or 24 hour clock time. Also, although the present invention is described in terms of "business" and "personal" categorization of data, those skilled in the art will recognize that any other appropriate category of data can also be used, for example, volunteer, family, friends, clients, etc. without limitation.

Time Based Profile Management on Palmtop Computer in Accordance with the Present Invention While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

FIG. 1 illustrates a system 50 that can be used in conjunction with the data entry system of the present invention. System 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Bus 54 is also coupled to a cradle 60 for receiving and initiating communication with a palmtop ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
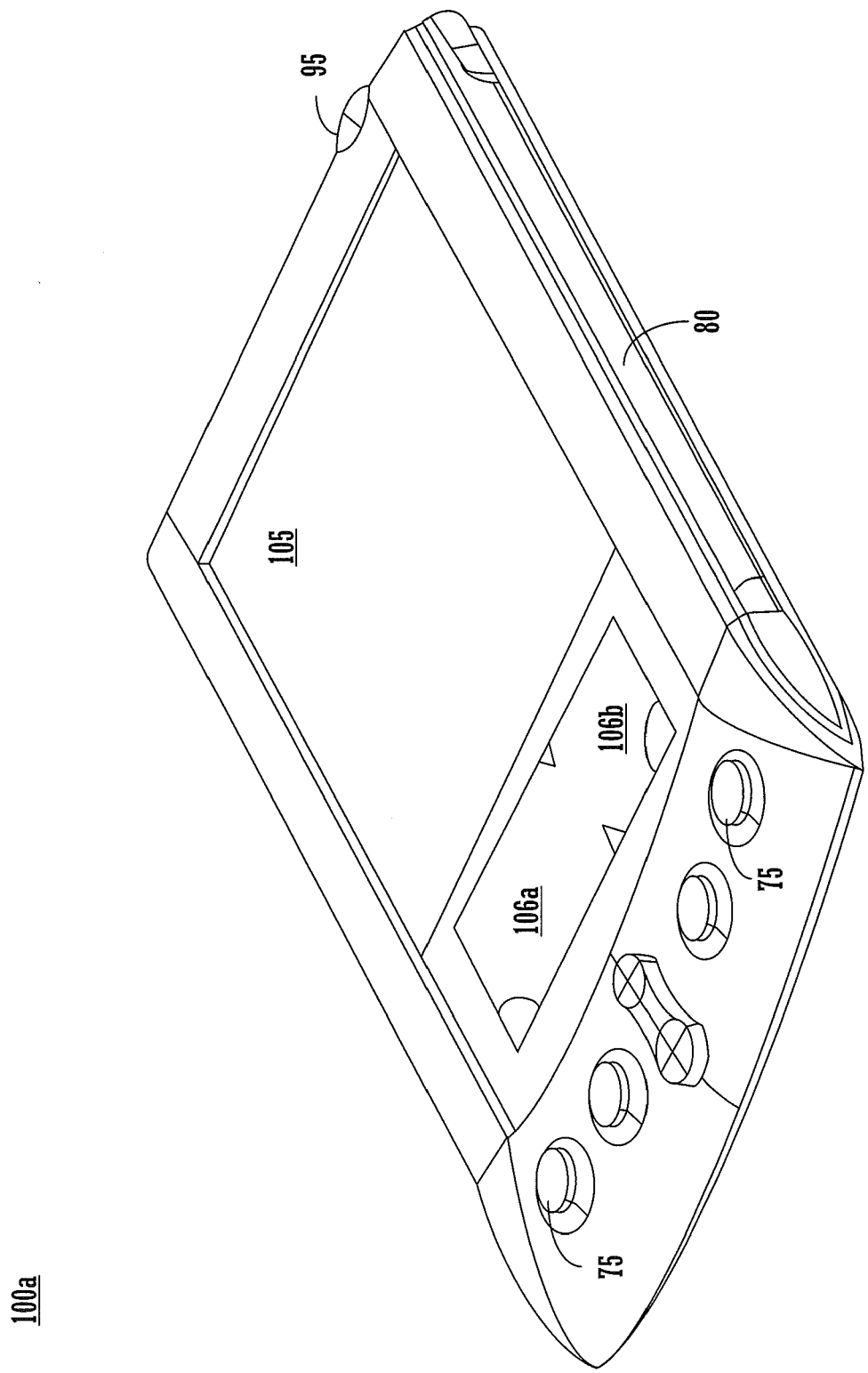
FIG. 2A is a top side perspective view of a palmtop computer system that can be used as a platform for data entry.

FIG. 2A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
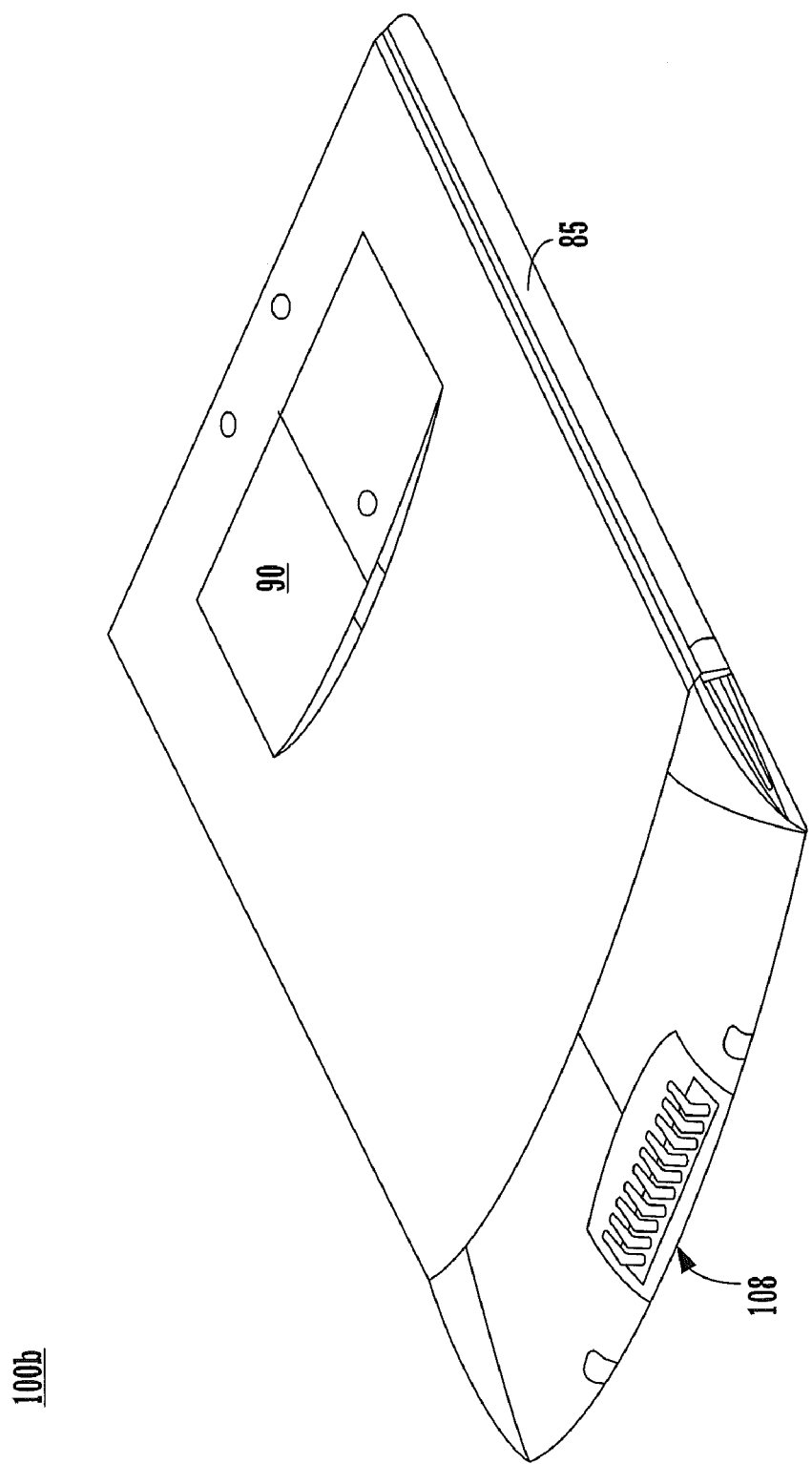
FIG. 2B is a bottom side perspective view of the palmtop computer system of FIG. 2A.

FIG. 2B illustrates the bottom side 100b of one embodiment of the palmtop computer system of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, USB (Universal Serial Bus), etc. In addition to providing the serial interface, some versions of palmtop computers consistent with the present invention include charging terminals for charging internal batteries through the cradle connection at interface 108. Accordingly, interface 108 typically comprises approximately ten to twelve electrical connector terminals.

Figure 3:
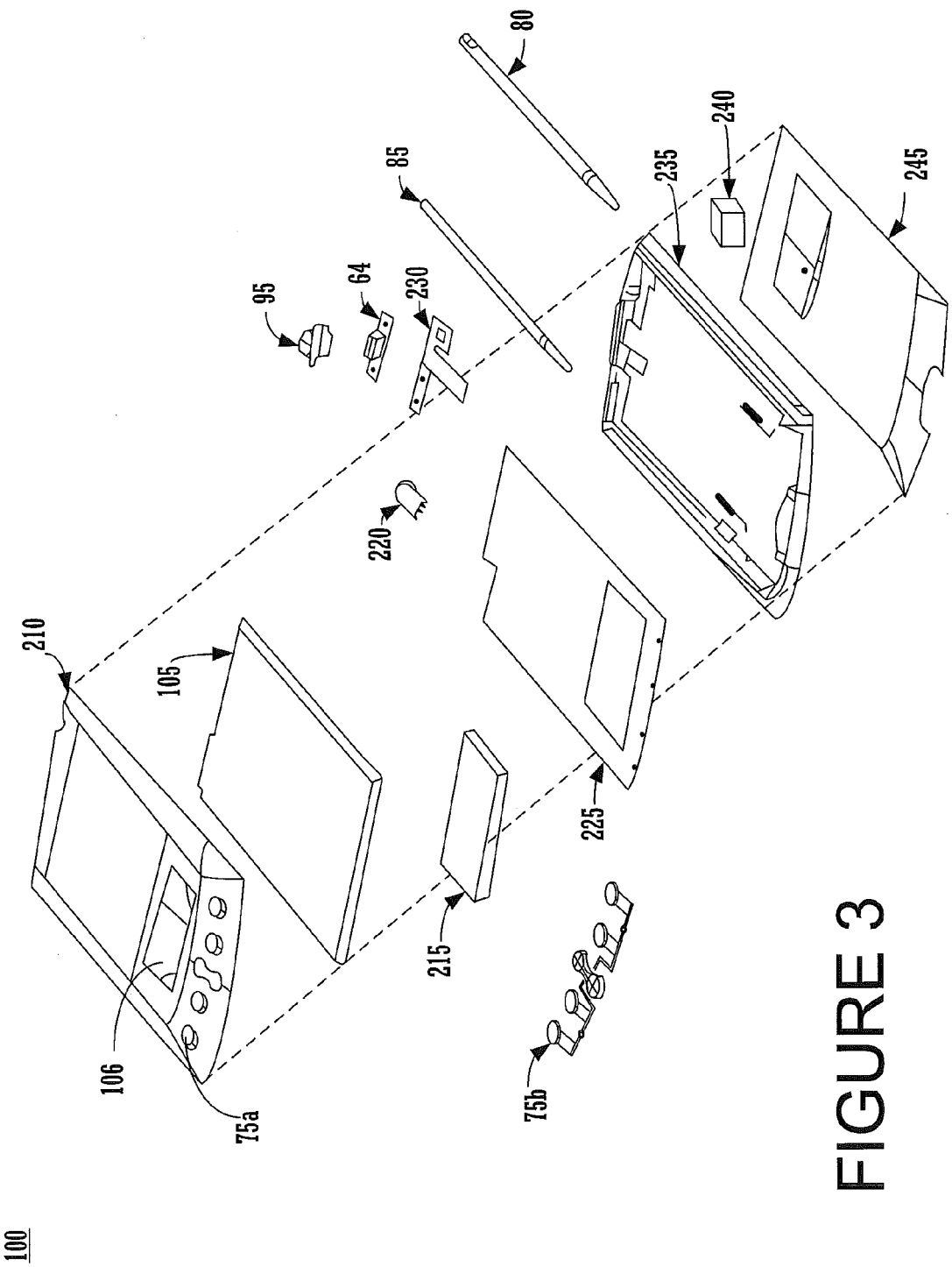
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Figure 4:
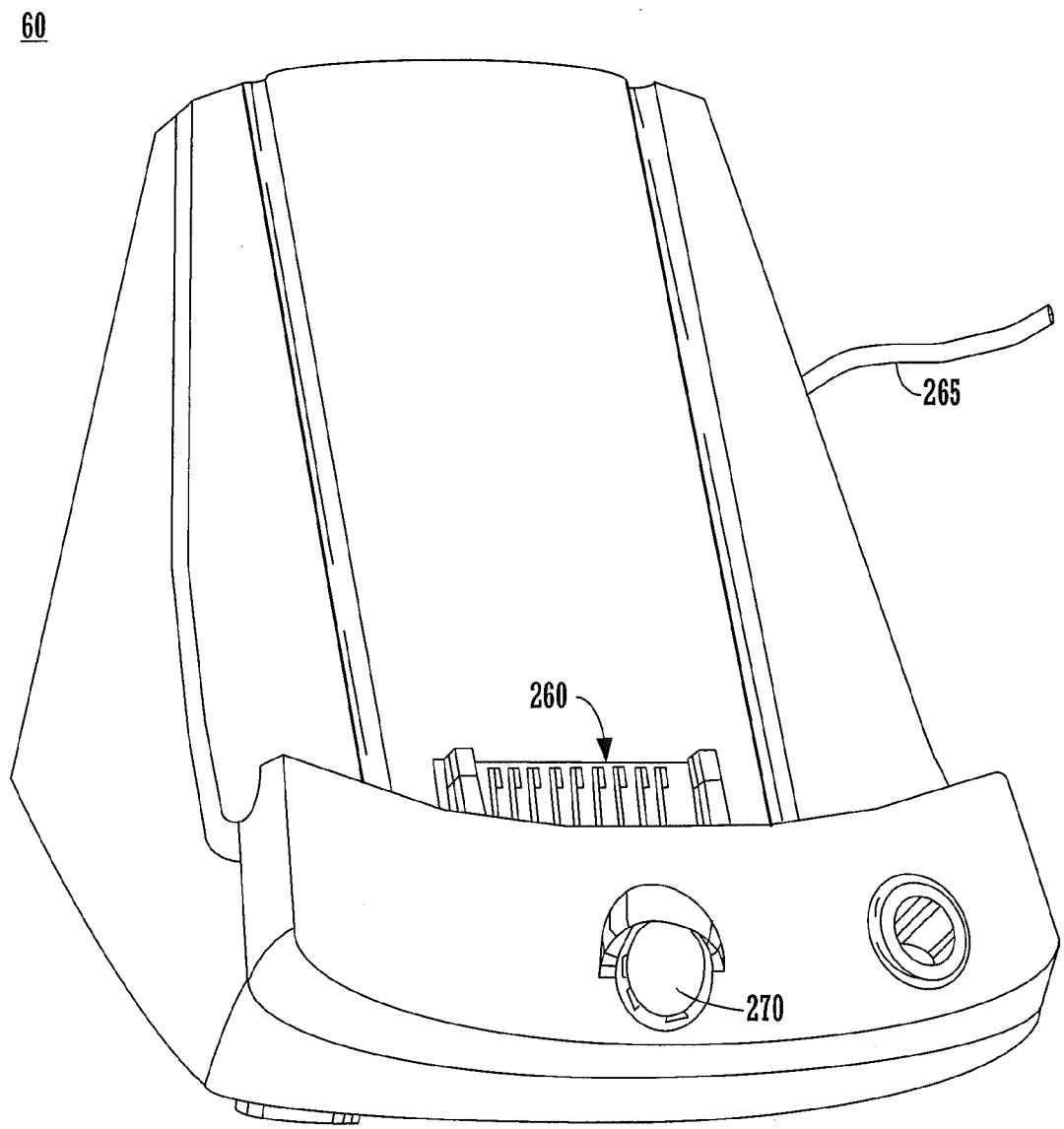
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 5:
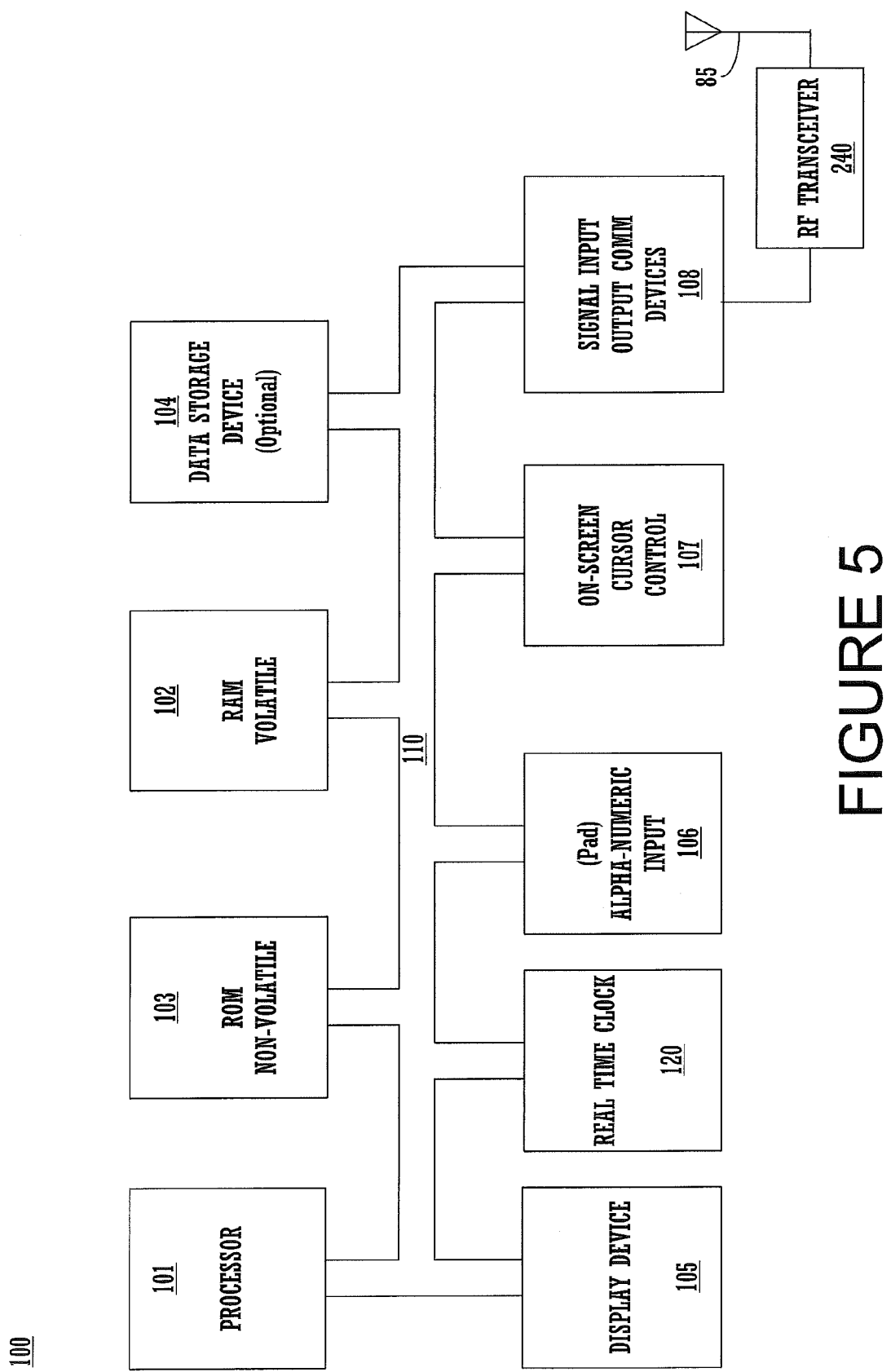
FIG. 5 is a logical block diagram of the palmtop computer system in accordance with an embodiment of the present invention.

FIG. 5 illustrates circuitry of computer system 100, some of which can be implemented on PC board 225. Computer system 100 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 110 also includes an optional data storage device 104 (e.g., memory stick, SD memory, etc.) coupled with the bus 100 for storing information and instructions. Device 104 can be removable. As described above, system 100 also contains a display device 105 coupled to the bus 100 for displaying information to the computer user. PC board 225 can contain the processor 101, the bus 100, the ROM 103 and the RAM 102.

Also included in computer system 110 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 100, can be a serial port for communicating with the cradle 60. Device 108 can also include an infrared communication port. Palmtop computer 100 includes a real-time clock 120 for maintaining time of day (time, day, date, month, year etc.) information.

Figure 6:
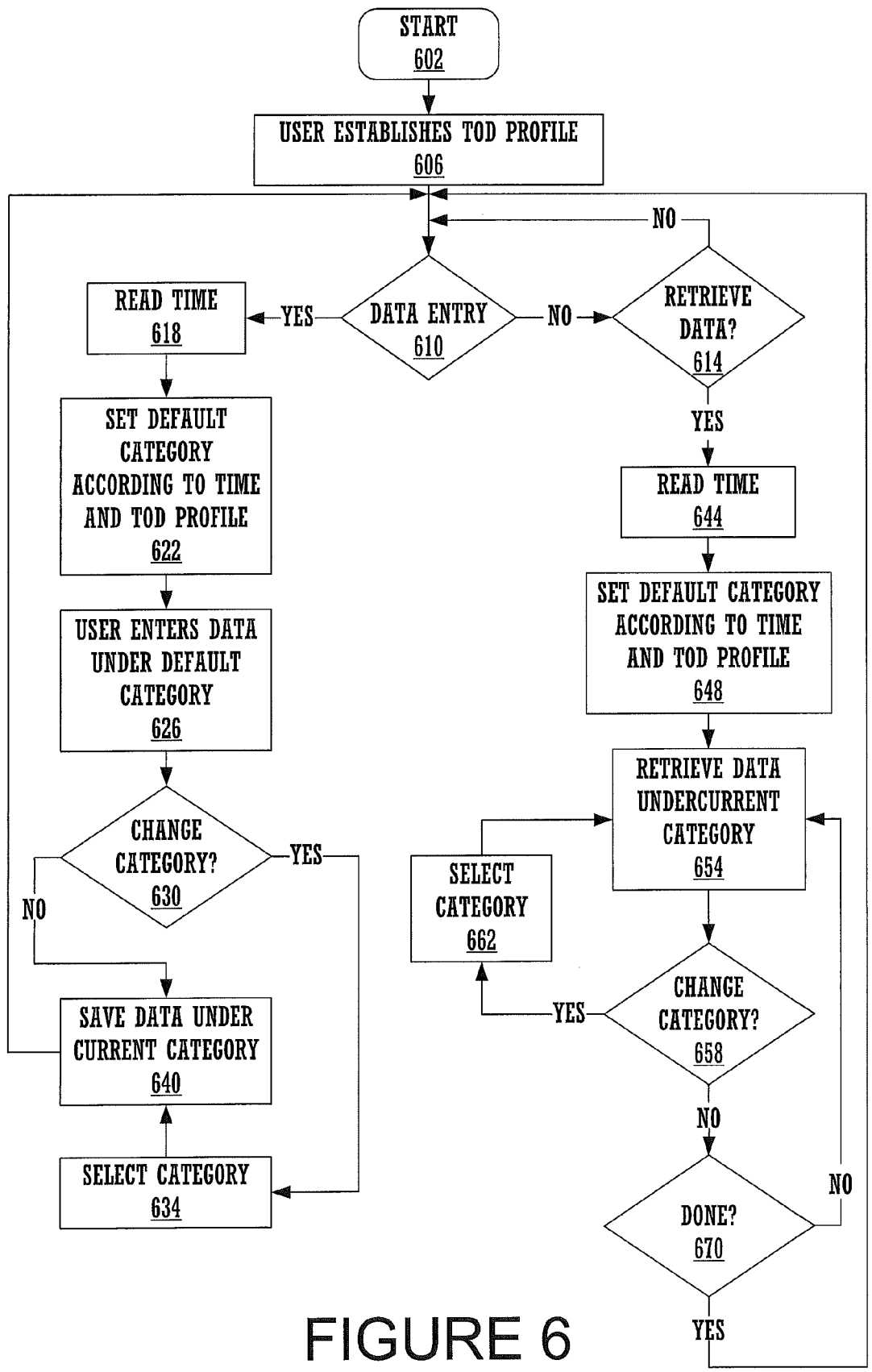
FIG. 6 is a flow chart of a process of utilizing time of day profiles in accordance with an embodiment of the present invention.

In accordance with certain embodiments of the present invention, a user established time of day (TOD) profile correlates time information (including day, month, year and clock time) with a category to be used as a default category within the personal information manager software or other software running on the palmtop computer 100. Provision can be made for controlled exceptions to the time profile established. With reference to FIG. 6, a process 600 that implements an embodiment of the present invention is illustrated. The process begins at 602 upon power up or activating the palmtop computer 100. At 606 the user establishes a time of day profile as part of the palmtop computer 100's system level defaults. During this process, the user establishes times, dates, months, years and days that the palmtop computer 100's personal information management software will correlate to particular default data categories. For example, the user can establish that Monday through Friday from 9 AM to 5 PM correlates to a business data category. All other times can be established as correlating to a personal category. Since the user might be working from 9 AM to 5 PM on business days, it is likely that any data that the user desires to either enter, edit, receive, display or retrieve during those time periods are related to business. During evenings and weekends, the user is more likely to be using the palmtop computer 100 and its personal information management software or other software in a personal capacity. Therefore, during weekend and evening time periods the user might likely wish for the palmtop computer to establish the category of data during those times as personal. Of course, other data categories and time, day, month, date, year, etc. correlations could be established in any suitable way at 606 in accordance with a user's particular use profile.

In accordance with process 600, after establishing the time of day profile at 606, the software continually monitors the user's actions at 610 and 614 to determine if the user is entering a data entry or editing mode at 610 or a data retrieval, display or query mode at 614. If the user is entering a data entry mode at 610, the software reads the current time at 618 from the palmtop computer 100's real-time clock 120. Based on the time of day information determined from the palmtop computer 100's real-time clock 120, the default category of data is set at 622 in accordance with the time of day profile. The user can then enter data (or edit data, compose a note, add to or create a to-do list, compose email, etc.) at 626 under the default category. In the event to the user wishes to change the category from that created in accordance with process 600 at 630, he or she may do so at 634. The data can then be saved under the current category, be that the default category or the user selected category, at 640. At this point, the process returns to 610.

In the event the user wishes to display, receive or retrieve data at 614 (which can include displaying a note, displaying a to-do list, receiving email and the like), the personal information manager software reads the current time from palmtop computer 100's real-time clock 120 at 644. The palmtop computer 100's default data category is then set at 648 in accordance with the current time as determined from the real-time clock 120 and from the time of day profile established at 606. At 654, the palmtop computer's personal information management software or other software (e.g. email software) retrieves or receives data under the current category. At this instant, the current category is established as the default category at 648. However, if the user wishes to change the current category at 658, a new category can be selected at 662 and data under the newly selected category is then retrieved at 654. When the user has completed viewing, retrieving or receiving the desired data at 670 by any of the data retrieval processes available to the palmtop computer during 654 in the palmtop computer 100, control returns to 610.

It should be noted that, although FIG. 6 depicts the time being monitored upon receipt of a request to either enter or display data, the time can be constantly (periodically) monitored in another embodiment to continually establish a default category, rather than setting the default category upon receipt of a user request to enter or retrieve data, without departing from the present invention. Other modifications of process 600 will occur to those skilled in the art.

Figure 7:
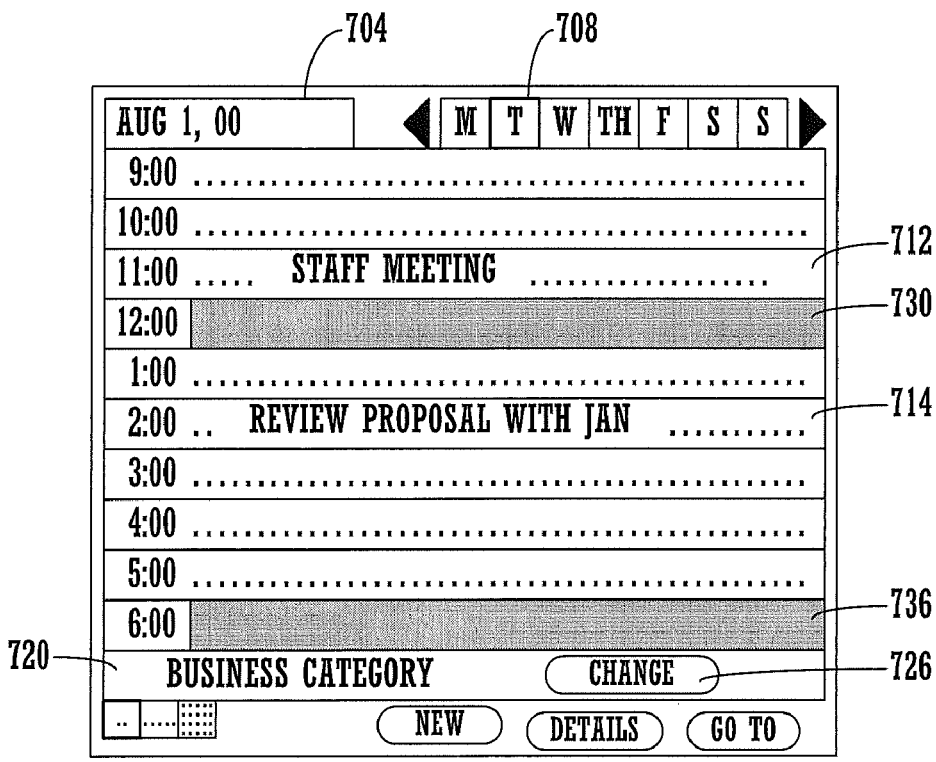
FIG. 7 is a screen image of an exemplary calendaring function of the palmtop computer showing a business category.

Referring now to FIG. 7, a screen image (as would appear on display screen 105) illustrating a calendar function as part of the personal information management software within the palmtop computer 100 is illustrated as 700. The current date is displayed at 704, and a menu of days showing that the current day is Tuesday appears to the right of the date at 708. In this example an 11:00 staff meeting is shown to be calendared at 712 and an appointment to review a proposal is illustrated at 2:00 as 714. Image 700 represents the business category displayed during times that are established as default business times as indicated by a display of the business category at 720. The user can change the category by selecting the change button at 726. This will either cycle through the available categories or display a menu of available categories for selection by the user, depending upon the system design. Other user interfaces for modifying the category or displaying calendar information can also be used without departing from the present invention. The time from 12:00 to 1:00, shown as 730, and from 6 o'clock to 7:00, shown as 736, are blacked out on the display to indicate that the time is unavailable for scheduling other events. However, the actual scheduled event is not visible (hidden) when the business category is displayed. Other embodiments are also possible without departing from the present invention.

Figure 8:
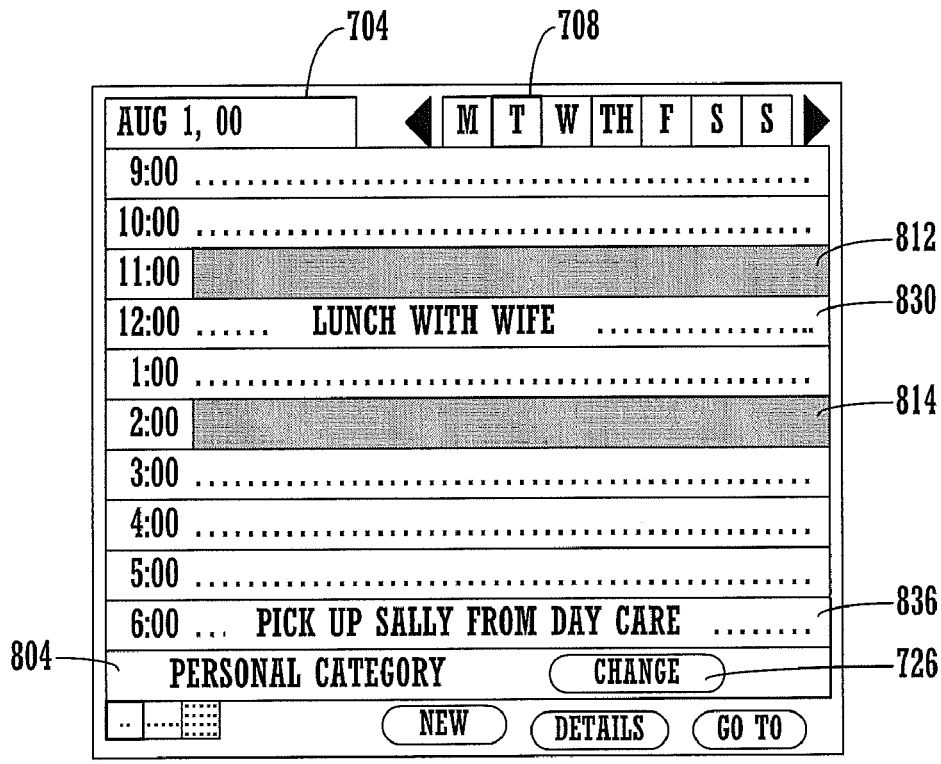
FIG. 8 is a screen image of an exemplary calendaring function of the palmtop computer showing a personal category.

Referring now to FIG. 8, a screen image 800 (as would appear on display screen 105) representing the same calendar 700 with the category changed to personal is illustrated. The fact that the category is now personal is illustrated at 804. The time at 812 between 11:00 and 12:00 and the time 814 between 2:00 and 3:00 are now illustrated blacked out (hidden) since these appointments are business-related. A lunch 830 and an errand to pick up a child from day-care at 836 are now visible since these relate to personal matters.

The examples given above in FIGS. 7 and 8 relate to calendaring functions. But the present invention should not be so limited, since other personal information management functions, such as to-do lists, notes and address books, can also be adapted to the present invention. Moreover, other functions such as email, web browsing and data downloads can be filtered based upon the time of day profile of the present invention. A single global set of defaults can be established to set up the time of day profile, or alternatively, a separate time of day profile can be established for each application as desired.

In accordance with the above, many features and variations are possible. For example, if an appointment is scheduled to overlap lunch time, the system can query the user as to whether to accept the default category or specify one. Address requests made during times designated as business would result in a default showing of business contacts. Exceptions can be established to provide for travel time etc. so that all actions taking place during travel would be considered business, for example.

The present invention can also be used to manipulate email data. For example, an email originating (or arriving) during business hours can be categorized by default as a business email and not be shown in a default email in-box except during business hours. Calls identified as from business associates could be directed to voice mail and the user notified during business hours. In addition, online content available through wired or wireless Internet connections can be filtered or retrieved based on the time of day profile. Thus, at a specified time during the day, stock quotes, traffic data, etc. can be requested. A frequently accessed web page could be accessed during a particular time of day. Other alternative embodiments will occur to those skilled in the art.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will also appreciate that the embodiments described above can be implemented using disc storage as well as other forms of electronic storage media for carrying the program and data including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A computer implemented method for a portable electronic device for automating the categorization of data based on clock time of day, comprising the steps of:

determining a clock time of day on a portable electronic device by referencing a real-time clock;

determining a day of a week;

referencing a time of day profile that correlates clock time of day information and day of week information with data categories stored on said portable electronic device, wherein at least one data category in said portable electronic device is associated with a block of time corresponding to two or more days of said week; and setting a default data category which differentiates between business and personal hours based upon the clock time of day, the day of the week, and the time of day profile that is used for accessing stored data in the portable electronic device and for storing entered data in the portable electronic device at that clock time of day based on the real-time clock, wherein the default data category includes a business category during business times in days and a personal category during personal times in days wherein the time of day profile correlates a clock time with at least one of a personal data category and a business data category.

2. The method according to claim 1, wherein said implemented method is carried out within a personal information manager program operating on a programmed processor residing within the portable electronic device.

3. The method according to claim 1, further comprising:
displaying only data categorized in the default data category and hiding data categorized in any other category; and
providing for editing of data categorized in the default data category.

4. The method according to claim 1, further comprising entering data categorized in the default data category.

5. The method according to claim 1, further comprising:
providing an option to change the default data category to a selected data category; and
entering data categorized in the selected data category.

6. The method according to claim 1, further comprising:
providing an option to change the default data category to a selected data category;
displaying only data categorized in the default data category; and
hiding data categorized in any other category.

7. The method according to claim 1, wherein the data comprises one of the group: address book data, to-do list data, notes data, email data and calendar data.

8. A portable electronic device, comprising:
a programmed processor;
a personal information manager program operating on the programmed processor;
a real-time clock for determining a clock time of day;
a calendar for indicating a day of a week;
first program means for referencing a time of day profile that correlates clock time of day information and day of week information with data categories, wherein at least one data category is associated with a block of time corresponding to two or more days of said week; and
second program means for setting a default data category which differentiates between business and personal hours for the personal information manager based upon the clock time of day, the day of the week, and the time of day profile that is used for accessing stored data in said portable electronic device and for storing entered data in the portable electronic device at that clock time of day, wherein the default data category is set to differentiate between business and personal hours of the day, wherein the time of day profile correlates a clock time with at least one of a personal data category and a business data category.

9. The-device according to claim 8, further comprising a display;
and wherein only data categorized in the default data category is displayed on the display;
and wherein data categorized in any other category is hidden.

10. The-device according to claim 8, further comprising data entry means for entering data categorized in the default data category and for editing data categorized in the default data category.

11. The-device according to claim 8, further comprising:
program means for changing the default data category to a selected data category; and
data entry means for entering data categorized in the selected data category.

12. The-device according to claim 8, further comprising:
a display;
program means for changing the default data category to a selected data category;
wherein only data categorized in the default data category is displayed on the display; and
wherein data categorized in any other category is hidden.

13. The-device according to claim 8, wherein the data comprises one of address book data, to-do list data, notes data and calendar data.

14. An electronic storage medium containing instructions which, when carried out on a programmed processor for a portable electronic device, carry out the steps of:
determining a clock time of day on the programmed processor;
determining a day of a week;
referencing a time of day profile that correlates clock time of day information and day of week information with data categories on the programmed processor, wherein at least one data category is associated with a block of time corresponding to two or more days of said week; and
setting a default data category which differentiates between business and personal hours based upon the clock time of day, the day of the week, and the time of day profile that is used for accessing stored data in the programmed processor and for storing entered data in the programmed processor at that clock time of day, wherein the default data category establishes differences between business and personal hours of the day, wherein the time of day profile correlates a clock time with at least one of a personal data category and a business data category; and wherein the data comprises one of address book data, notes data, email data, to-do list data and calendar data.

15. The electronic storage medium according to claim 14, further comprising a personal information manager program operating on a programmed processor residing within a portable electronic device.

16. The electronic storage medium according to claim 14, further comprising:
providing an option to change the default data category to a selected data category; and
entering data categorized in the selected data category.

17. The electronic storage medium according to claim 14, further comprising:
displaying only data categorized in the default data category and hiding data categorized in any other category;
providing an option to change the default data category to a selected data category;
if the default category is changed to the selected category, displaying only data categorized in the selected data category and hiding data categorized in any other category.

18. A computer implemented method of automating categorization of data for a portable electronic device, comprising the steps of:
determining a current time of day on a portable electronic device based on a real-time clock;
determining a day of a week;
referencing a time of day profile that correlates current time of day information and day of week information with data categories on said portable electronic device, wherein at least one data category is associated with a block of time corresponding to two or more days of said week;
setting a default data category which differentiates between business and personal hours based upon said current time of day, the day of the week, and said time of day profile wherein the default data category establishes differences between business and personal hours; and performing actions only within said default data category in the handheld computer at that clock time of day.

19. The method of claim 18, wherein said actions is taken from a list consisting of:
  creating a data entry;
  editing a previously created data entry;
  retrieving said previously created data entry;
  displaying data in said previously created data entry; and
  querying said default data category.

20. The method of claim 18, wherein said current time of day comprises:
  current time information;
  current day of the week information;
  current month of the year information; and
  current year information.

21. The method of claim 18, further comprising:
  changing said default data category to another data category for performing actions only within said another data category.

* * * * *